Patented Feb. 8, 1927.

1,617,006

UNITED STATES PATENT OFFICE.

JAMES J. BARRY, OF GLOUCESTER, MASSACHUSETTS, ASSIGNOR, BY DIRECT AND MESNE ASSIGNMENTS, TO GENERAL SEAFOODS CORPORATION, OF GLOUCESTER, MASSACHUSETTS, A CORPORATION OF DELAWARE.

METHOD OF PRESERVING FOOD PRODUCTS.

No Drawing.     Application filed October 1, 1924. Serial No. 741,046.

This invention has for its object to treat various vegetables, fruits, and meat and fish products with carbon dioxid, $CO_2$, in such manner that the food products may be preserved for a considerable period of time without deterioration.

It is a matter of common knowledge that many food products which are packed in tins show evidence of having undergone change after having been packed. Such evidence of change is commonly shown by discoloration in the nature of dark spots within the tin or container and on the food product in contact with the walls of the tin. The reasons for the appearance of such dark spots or discolorations in the tins and on the goods packed therein are not fully understood but seem to be due to the incomplete sterilization of the food product either prior to or after packing in the tins, the incomplete sterilization allowing harmful bacteria to thrive and propagate for a time at least.

After numerous experiments, I have discovered a process of treating food products to be packed in tins or other containers that insures complete sterilization of the food product at temperatures that are not harmful to the product. I shall first explain the new process as used in treating corn, a product that has been found difficult to pack and in which black specks frequently develop. The corn is put in a closed cooker and stirrer and cooked for a period at 212° F., atmospheric pressure. During the cooking and stirring of the corn the chamber or cooker is put under a vacuum to withdraw the air, the vacuum being as high as possible, or such vacuum may be obtained with ordinary apparatus. $CO_2$ is then allowed to enter the chamber either hot or at room temperature, the $CO_2$ becoming hot in any event, inasmuch as the corn is being cooked and is also thoroughly mixed with the corn by the stirring mechanism. The $CO_2$ is allowed to flow into the cooking chamber until the same has been put under considerable pressure, say not less than forty pounds, though the degree of pressure may be varied within a considerable range. Cooking of the corn is continued for a time while the $CO_2$ is maintained under pressure, the temperature, however, not being necessarily increased. After the corn has been thoroughly impregnated with hot $CO_2$ with resultant substitution of $CO_2$ for air in the corn, the pressure on the $CO_2$ is released and the corn passed through a can filling machine, the cans thereafter being immediately sealed. The filled cans are then processed thirty minutes at 235° F. to obtain complete sterilization of the contained product. The period and temperature necessary for effecting complete sterilization are less than customarily employed, it being heretofore necessary to process the sealed product about one hour at 240° F. Considerable saving in time in the final processing is therefore obtained. Also the lower temperature is an important factor not only from the standpoint of generation of the same but primarily in that high temperatures have a deleterious effect on the product. Even a small reduction of temperature is therefore an important factor.

Corn treated and packed according to my improved process does not become specked, nor do the tins become specked, and the product has an improved flavor.

As indicated above, the process is applicable to other food products, any variation from the essential steps in the process depending on the nature of the product to be treated. For example, in treating beets, the stirring of the same would be omitted and the beets would be placed in open tins, the tins being placed in a cooking chamber. Fish and meats would likewise not be stirred. The important thing is that the food product shall be subjected to hot $CO_2$ after the air has been exhausted from the product. The $CO_2$ can be heated as it comes from its source of supply, a procedure which will probably be found the more satisfactory. When the food product is not susceptible of stirring, intimate mixing of the gas and product may be effected by blowing the gas through the bottom of the chamber. It will also be understood that the time required for processing any product will depend upon the nature of the product, some requiring less time and temperature than others.

What I claim is:

1. The process of preserving corn which consists in cooking and stirring the same in a chamber, exhausting the air therefrom, replacing the air with $CO_2$ under pressure while the corn is being cooked and stirred, releasing the pressure on the $CO_2$, transferring the cooked corn to containers, and sealing the same, and finally subjecting the sealed product to a sterilizing temperature.

2. The process of preserving corn consisting of placing the corn in a closed chamber and cooking it for a period, during which period the chamber is put under vacuum, $CO_2$ is then allowed to enter the chamber until a desirable pressure has been reached, cooking is continued while the $CO_2$ is maintained under pressure, after the corn has been thoroughly impregnated with hot $CO_2$ with resultant substitution of $CO_2$ for air in the corn, the pressure on the $CO_2$ is released and the corn passed through a corn filling machine.

In testimony whereof I affix my signature.

JAMES J. BARRY.